Jan. 30, 1923.
G. B. ALLION.
VERMIN PROOF POULTRY PERCH.
FILED JULY 23, 1921.
1,443,333
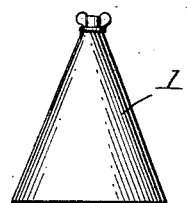
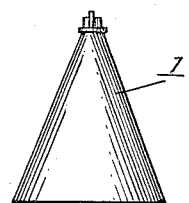
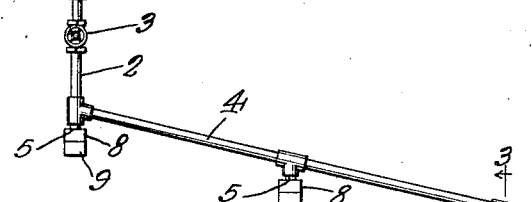
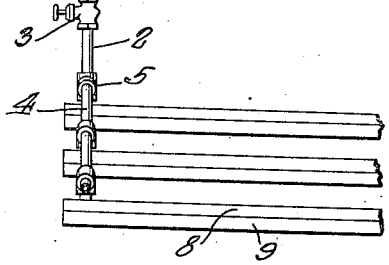
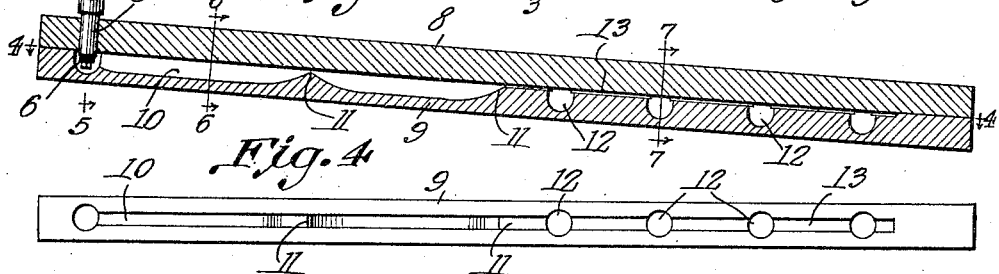
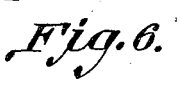
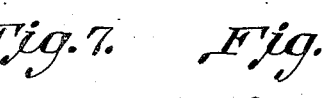
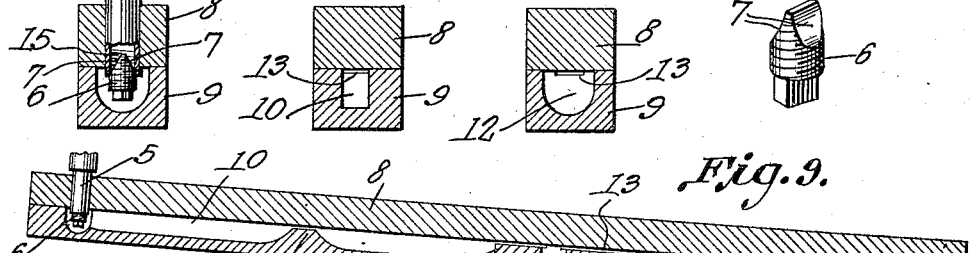
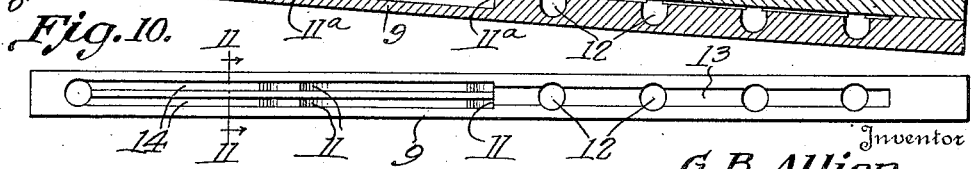
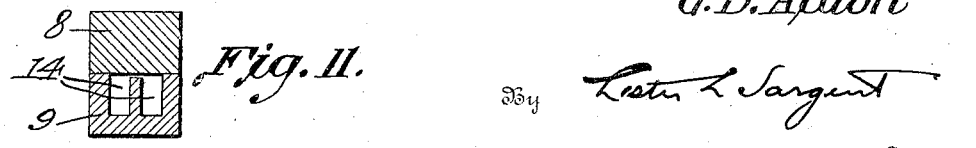
Inventor
G. B. Allion
By Lester L. Sargent
Attorney Patented Jan. 30, 1923.

1,443,333

UNITED STATES PATENT OFFICE.

GEORGE B. ALLION, OF WAUSEON, OHIO.

VERMINPROOF POULTRY PERCH.

Application filed July 23, 1921. Serial No. 487,058.

*To all whom it may concern:*

Be it known that I, GEORGE B. ALLION, a citizen of the United States, residing at Wauseon, in the county of Fulton and State of Ohio, have invented a new and useful Verminproof Poultry Perch, of which the following is a specification.

The object of my invention is to provide a novel type of perch made in two sections and having a novel form of channel for evenly distributing the insecticide throughout the length of the perch; and to provide a novel combination of these features disclosed in the accompanying drawings, in which—

Figure 1 is an end elevation of the poultry perches and the insecticide-supplying means thereto;

Fig. 2 is a front elevation of same;

Fig. 3 is a longitudinal vertical section on line 3—3 of Fig. 1;

Fig. 4 is a top plan view of member 9;

Fig. 5 is a transverse section on line 5—5 of Fig. 3, with a portion of the pipe 5 shown in elevation, and member 6 also shown in elevation;

Fig. 6 is a section on line 6—6 of Fig. 3;

Fig. 7 is section on line 7—7 of Fig. 3;

Fig. 8 is a detail perspective view of valve 6;

Fig. 9 is a section similar to Fig. 3 but illustrating the member 11$^a$;

Fig. 10 is a top plan of a preferred form of member 9; and

Fig. 11 is a section on line 11—11 of Fig. 10.

Like characters of reference indicate similar parts in each of the several views.

Referring to the accompanying drawings, I provide a novel conical insecticide-supply tank 1, which, by reason of its shape, prevents the poultry from roosting on the tank and insures their roosting on the perches.

I provide a suitable conduit 2 from supply tank 1 leading to the distributing pipe 4, from which pipe the insecticide fluid is conducted through suitable discharge branch pipes or outlets 5 which open into the furrows or trenches 6 of each of the bottom sections 9 of the several perches 8, as shown in Figs. 1 and 3. The branch pipes or outlets 5 are provided with novel valves 6 which permit of regulation of the discharge of insecticide fluid before the pipes 5 are inserted into the perches. Valve 6 is provided with opposite beveled portions 7 and is threaded, as shown in Fig. 8, to engage the interiorly threaded portion 15 of pipe or outlet 5, to permit a small amount of insecticide fluid to flow past the beveled portion of the valve 6 to the furrow or trench of the poultry perch.

Perches 8 are provided with a lower section having a furrow 10 of some depth, provided at suitable intervals with one or more dams 11 or 11$^a$, and communicating with a shallower channel 13 also extending longitudinally of the perch section 9 and communicating with spaced pockets or wells 12, which are provided to insure substantially even distribution of the insecticide fluid throughout the length of the perch, which is mounted in the poultry house in a slightly inclined or downwardly slanting position relative to the longitudinal dimension of the perches to insure the flow of the insecticide fluid throughout the length of the perch by gravity and by capillary attraction and absorption into the fibers of the perch through which it seeps from the furrows or trenches and wells, as above described.

For the purpose of more efficiently and quickly causing the insecticide fluid to seep through the walls of the perch, I have provided a modified and improved construction, illustrated in Figs. 10 and 11, having a plurality of furrows or trenches 14 in place of the single furrow 10, for whatever length of the perch is desired, so that the insecticide fluid will seep through the wood in a less length of time than with the single channel, thereby producing more speedy results and at the same time holding more insecticide fluid.

The perch may be made so as to hold enough insecticide fluid to last for six months, and thus do away with frequent filling, and, if desired, the tank 1 may be eliminated and the perches filled by hand.

It is also within the contemplation of my invention to utilize a perch in which the dams 11 or 11$^a$ are combined with the pockets or wells 12, as illustrated in the drawings, or to provide a perch using either of those elements individually.

In the usual operation of the device, the insecticide tank 1, which has a removable cap, or cover, is filled with insecticide fluid which flows through pipe 2 when the manually-controlled valve 3 is open, permitting the insecticide to flow into pipe 4 and thence through outlets 5 past the valves 6, which are first manually regulated to allow a greater or lesser amount of insecticide to flow, as may be desired, into the channels of the poultry perches. Each of the poultry perches is mounted in a slightly inclined position, as illustrated in Figs. 3 and 9, and the insecticide flows down the channels 10 (or 14), being somewhat retarded by the dams 11 (or $11^a$) and through the shallower channel 13 into the spaced pocket 12, seeping through the absorbent fibers of the wood perch, thoroughly permeating or saturating the pores of the perch with insecticide fluid throughout its entire length, thereby making it thoroughly vermin-proof, and preventing lice getting on the poultry.

What I claim is:

In a vermin-proof poultry perch, the combination of an upper section and a lower section, the lower section having a plurality of spaced longitudinally extending furrows for insecticide fluid, said furrows being parallel, and of varying depth at different portions of the perch to insure a more equal distribution of the insecticide fluid throughout the perch.

GEORGE B. ALLION.